US010166644B2

(12) United States Patent
Kume et al.

(10) Patent No.: US 10,166,644 B2
(45) Date of Patent: Jan. 1, 2019

(54) PROCESSING INSPECTION WORKPIECE FOR MACHINE TOOL, AND ON-MACHINE MEASUREMENT METHOD USING SAID WORKPIECE

(71) Applicant: MITSUBISHI HEAVY INDUSTRIES MACHINE TOOL CO., LTD., Ritto-shi, Shiga (JP)

(72) Inventors: Takayuki Kume, Tokyo (JP); Toshiya Narihara, Tokyo (JP); Michinori Sengiku, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 294 days.

(21) Appl. No.: 15/026,291

(22) PCT Filed: Oct. 16, 2014

(86) PCT No.: PCT/JP2014/077483
§ 371 (c)(1),
(2) Date: Mar. 31, 2016

(87) PCT Pub. No.: WO2015/072273
PCT Pub. Date: May 21, 2015

(65) Prior Publication Data
US 2016/0243663 A1 Aug. 25, 2016

(30) Foreign Application Priority Data

Nov. 12, 2013 (JP) .................................. 2013-233604

(51) Int. Cl.
G01B 5/00 (2006.01)
B23Q 17/20 (2006.01)
(Continued)

(52) U.S. Cl.
CPC ......... B23Q 17/20 (2013.01); B23Q 17/2233 (2013.01); G01B 5/008 (2013.01); G01B 21/042 (2013.01)

(58) Field of Classification Search
CPC ...... B23Q 5/045; B23Q 16/02; B23Q 16/102; B23Q 11/0025; B23Q 17/20; B23Q 17/2233; G01B 21/042; G01B 5/008
(Continued)

(56) References Cited

U.S. PATENT DOCUMENTS 5,797,191 A * 8/1998 Ziegert .................. G01B 5/008
33/503
6,023,850 A * 2/2000 Trapet .................. G01B 21/042
33/502
(Continued)

FOREIGN PATENT DOCUMENTS

CN 101387501 A 3/2009
CN 102785128 A 11/2012
(Continued)

OTHER PUBLICATIONS

International Preliminary Report on Patentability and English translation of the Written Opinion of the International Searching Authority (Forms PCT/IB/338, PCT/IB/373 and PCT/ISA/237), dated May 26, 2016, for International Application No. PCT/JP2014/077483.
(Continued)

Primary Examiner — Yaritza Guadalupe-McCall
(74) Attorney, Agent, or Firm — Birch, Stewart, Kolasch & Birch, LLP

(57) ABSTRACT

Provided is a processing inspection workpiece for a machine tool with which it is possible to inspect tool precision by subjecting the machine tool to on-machine measurement. Also provided is an on-machine measurement method using said workpiece. In a processing inspection workpiece, five
(Continued)

surfaces, excluding a hexahedron bottom surface, function as processing surfaces, and multiple reference surfaces, which are in the same direction as the respective processing surfaces and for which multiple in-plane coordinates are already known, are disposed on each processing surface. A machine tool is subjected to on-machine measurement using said processing inspection workpiece.

4 Claims, 3 Drawing Sheets

(51) Int. Cl.
    *B23Q 17/22* (2006.01)
    *G01B 5/008* (2006.01)
    *G01B 21/04* (2006.01)

(58) Field of Classification Search
    USPC .......................................................... 33/503
    See application file for complete search history.

(56) References Cited

U.S. PATENT DOCUMENTS

| | | | | |
|---|---|---|---|---|
| 9,014,999 | B2* | 4/2015 | Turbell | G01B 11/2504 |
| | | | | 702/104 |
| 9,726,481 | B2* | 8/2017 | McMurtry | G01B 7/008 |
| 2001/0024283 | A1* | 9/2001 | Granger | B25J 9/1692 |
| | | | | 356/620 |
| 2014/0157861 | A1* | 6/2014 | Jonas | G01B 5/008 |
| | | | | 73/1.79 |
| 2016/0153767 | A1* | 6/2016 | Ihlenfeldt | G01B 11/005 |
| | | | | 33/503 |
| 2016/0243663 | A1* | 8/2016 | Kume | B23Q 17/20 |

FOREIGN PATENT DOCUMENTS

| | | |
|---|---|---|
| JP | 62-95848 U | 6/1987 |
| JP | 10-296588 A | 11/1998 |
| JP | 2005-88172 A | 4/2005 |
| JP | 2006-21277 A | 1/2006 |
| JP | 2006-281353 A | 10/2006 |
| JP | 2007-141072 A | 6/2007 |
| JP | 2012-86325 A | 5/2012 |

OTHER PUBLICATIONS

International Search Report (Form PCT/ISA/210), dated Jan. 13, 2015, for International Application No. PCT/JP2014/077483.
Chinese Office Action dated Nov. 30, 2016 received in corresponding Chinese Application No. 201480053728.9 with an English Translation.

* cited by examiner

PROCESSING INSPECTION WORKPIECE FOR MACHINE TOOL, AND ON-MACHINE MEASUREMENT METHOD USING SAID WORKPIECE

TECHNICAL FIELD

The present invention relates to a processing inspection workpiece for a machine tool, which enables an inspection of a working accuracy by utilizing on-machine measurement of a machine tool, and an on-machine measurement method using said workpiece.

BACKGROUND ART

In a conventional method for inspecting a working accuracy of a machine tool, a test piece is processed with a machine tool, and the processed test piece is then measured using a coordinate measuring machine to inspect the working accuracy of the machine tool.

PRIOR ART DOCUMENT

Patent Document

Patent Document 1: Japanese Patent Application Publication No. 2006-021277

SUMMARY OF THE INVENTION

Problems to be Solved by the Invention

However, the above-described inspection method has problems that a measurement cannot be performed without a coordinate measuring machine, and that the accuracy varies depending on the environment where a coordinate measuring machine is installed.

For example, an accuracy measurement has been proposed in which a machine tool that has processed a test piece performs on-machine measurement (Patent Document 1). However, in the conventional on-machine measurement, the machine tool processes a test piece and measures the test piece by itself. This theoretically results in no error in some cases, and makes it difficult to employ such a measurement for the inspection of a working accuracy.

The present invention has been made in view of the above-described problems. An object of the present invention is to provide a processing inspection workpiece for a machine tool, which enables an inspection of a working accuracy through on-machine measurement of a machine tool, and an on-machine measurement method using said workpiece.

Means for Solving the Problems

A processing inspection workpiece for a machine tool according to a first aspect of the invention to achieve the above object is a processing inspection workpiece for a machine tool used for on-machine measurement of the machine tool, comprising:
at least one processing surface; and
at least one reference surface facing in a direction in which the processing surface faces, and having a plurality of in-plane measurement points whose coordinates are known.

A processing inspection workpiece for a machine tool according to a second aspect of the invention to achieve the above object is the processing inspection workpiece for a machine tool according to the first aspect of the invention, wherein
the processing inspection workpiece has a shape of a hexahedron,
each of five surfaces of the hexahedron excluding a bottom surface thereof is the processing surface, and
each of the processing surfaces is provided with a plurality of the reference surfaces.

An on-machine measurement method using the processing inspection workpiece for a machine tool according to a third aspect of the invention to achieve the above object is an on-machine measurement method using the processing inspection workpiece for a machine tool according to the first or second aspect of the invention, the method comprising:
replacing an attachment of the machine tool with a measurement sensor configured to detect a contact position with the processing inspection workpiece, after the machine tool processes the processing inspection workpiece;
performing a first measurement to measure the measurement points on the reference surface by using the measurement sensor;
performing, after the first measurement, a second measurement to measure a measurement point on the processing surface near the measurement points on the reference surface by using the measurement sensor; and
detecting coordinates of all the measurement points by alternately performing the first measurement and the second measurement on all of the reference surface and the processing surface.

An on-machine measurement method using the processing inspection workpiece for a machine tool according to a fourth aspect of the invention to achieve the above object is the on-machine measurement method using the processing inspection workpiece for a machine tool according to the third aspect of the invention, wherein coordinates of at least the measurement point on the processing surface among the measurement points on the reference surface and the processing surface are determined from average values of coordinates obtained by measuring a position of the measurement point on the processing surface and three or more positions on a circle having a predetermined radius and a center located at the position of the measurement point.

Effects of the Invention

According to the present invention, the use of the processing inspection workpiece having the reference surface(s) enables an accurate on-machine measurement of a machine tool, and an inspection of a working accuracy without a coordinate measuring machine.

Moreover, the present invention makes it possible to eliminate error data during the on-machine measurement by measuring multiple points on a circle having the center located at a measurement target point on the processing surface of the processing inspection workpiece, and to enhance the reliability of measured data.

MODE FOR CARRYING OUT THE INVENTION

Hereinafter, a processing inspection workpiece for a machine tool according to the present invention and an on-machine measurement method using said workpiece will be described with reference to FIGS. 1 to 3.

EMBODIMENTS

Embodiment 1

Figure 1A:
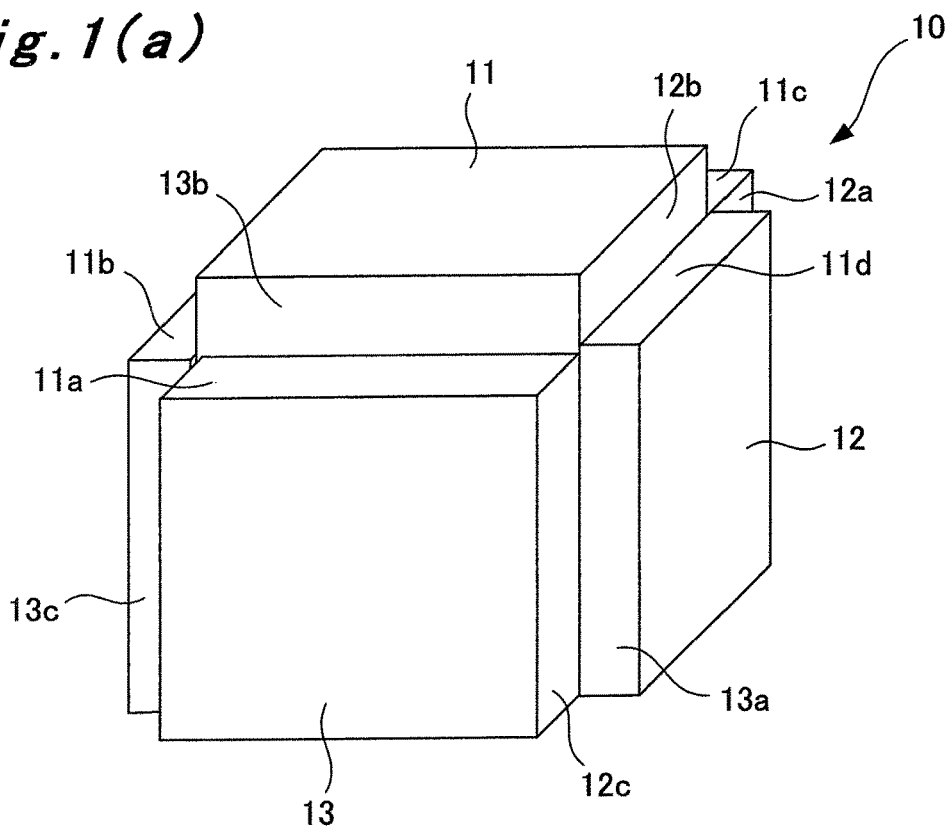
FIG. 1 shows views for illustrating an example of an embodiment of a processing inspection workpiece for a machine tool according to the present invention, Part (a) thereof is a perspective view of the processing inspection workpiece viewed in a given direction, and Part (b) thereof is a perspective view of the processing inspection workpiece viewed in a direction opposite to the given direction.
Figure 1B:
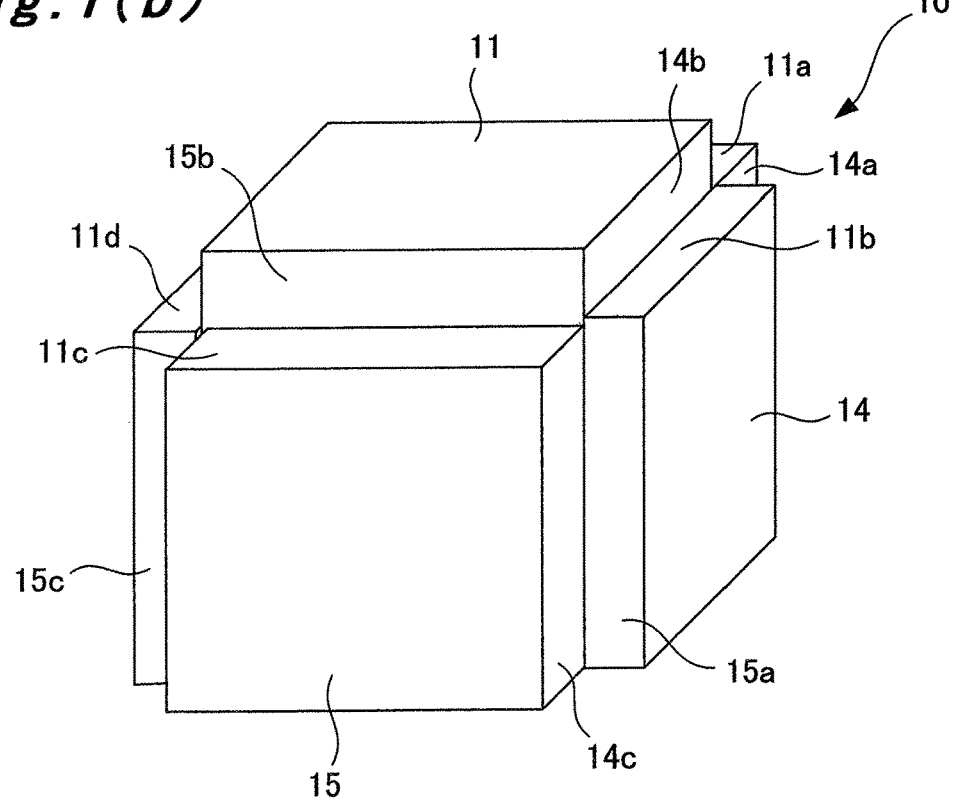
Figure 2A:
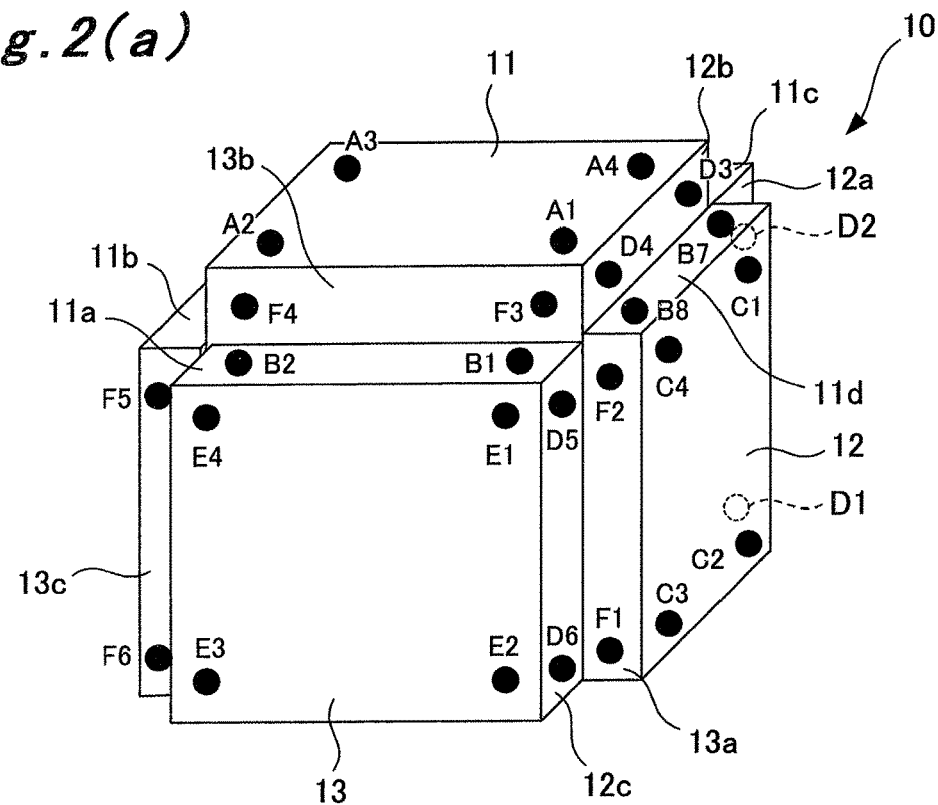
FIG. 2 shows views for explaining an example of an embodiment of an on-machine measurement method using the processing inspection workpiece for a machine tool according to the present invention, Part (a) thereof is a perspective view of the processing inspection workpiece viewed in the given direction, and Part (b) thereof is a perspective view of the processing inspection workpiece viewed in the direction opposite to the given direction.
Figure 2B:
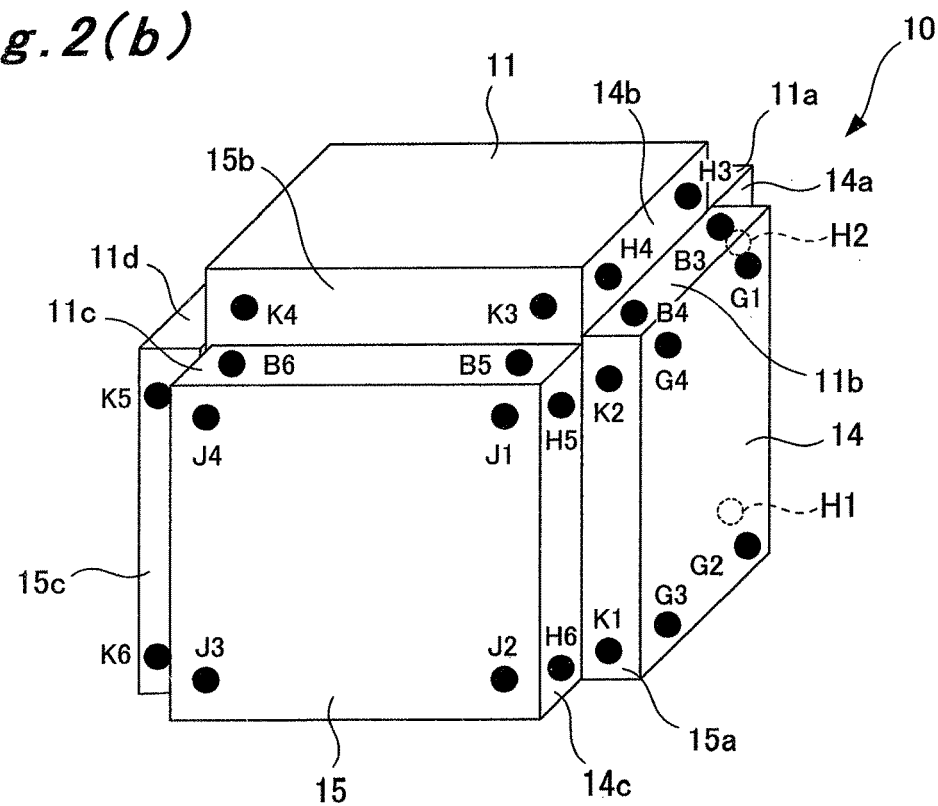

FIG. 1 shows views for illustrating a processing inspection workpiece for a machine tool of the present embodiment, Part (a) of FIG. 1 is a perspective view of the processing inspection workpiece viewed in a given direction, and Part (b) of FIG. 1 is a perspective view of the processing inspection workpiece viewed in a direction opposite to the given direction. Moreover, FIG. 2 shows views for explaining an on-machine measurement method using the processing inspection workpiece for a machine tool of the present embodiment, Part (a) of FIG. 2 is a perspective view of the processing inspection workpiece viewed in the given direction, and Part (b) of FIG. 2 is a perspective view of the processing inspection workpiece viewed in the direction opposite to the given direction. Further, FIG. 3 shows views for more specifically explaining the on-machine measurement method using the processing inspection workpiece for a machine tool of the present embodiment, Part (a) of FIG. 3 is a perspective view of the processing inspection workpiece, Part (b) of FIG. 3 is an enlarged view of measurement points on a reference surface, and Part (c) of FIG. 3 is an enlarged view of measurement points on a processing surface.

A processing inspection workpiece 10 of the present embodiment is used for on-machine measurement of a machine tool (the illustration is omitted), and enables an inspection of a working accuracy of a machine tool through on-machine measurement on the processing inspection workpiece 10 using a measurement sensor attached to the machine tool, after the machine tool processes the processing inspection workpiece 10.

Specifically, as shown in Parts (a) and (b) of FIG. 1, the processing inspection workpiece 10 has a shape of a hexahedron. Five processing surfaces 11 to 15 of the hexahedron excluding a bottom surface thereof are cut and processed into such a configuration that the processing surfaces 11 to 15 are respectively provided with reference surfaces 11a to 11d, 12a to 12c, 13a to 13c, 14a to 14c, and 15a to 15c.

The processing surface 11 as a top surface is provided with the four reference surfaces 11a to 11d all of which face in a direction in which the processing surface 11 faces. The processing surface 12 as a surface at a 0-degree position is provided with the three reference surfaces 12a to 12c all of which face in a direction in which the processing surface 12 faces. The processing surface 13 as a surface at a 90-degree position is provided with the three reference surfaces 13a to 13c all of which face in a direction in which the processing surface 13 faces. The processing surface 14 as a surface at a 180-degree position is provided with the three reference surfaces 14a to 14c all of which face in a direction in which the processing surface 14 faces. The processing surface 15 as a surface at a 270-degree position is provided with the three reference surfaces 15a to 15c all of which face in a direction in which the processing surface 15 faces. It should be noted that, for the sake of convenience, the processing surface 12 is the surface at a 0-degree position, the processing surface 13 is the surface at a 90-degree position, the processing surface 14 is the surface at a 180-degree position, and the processing surface 15 is the surface at a 270-degree position.

In addition, all of the reference surfaces 11a to 11d, 12a to 12c, 13a to 13c, 14a to 14c, and 15a to 15c of the processing inspection workpiece 10 have multiple known accuracies (known measured coordinate values) which serve as measurement references.

Specifically, all of the reference surfaces 11a to 11d, 12a to 12c, 13a to 13c, 14a to 14c, and 15a to 15c have been measured in advance with a coordinate measuring machine. For example, as shown in Parts (a) and (b) of FIG. 2, measurement points B1 and B2 have been measured on the reference surface 11a, measurement points B3 and B4 have been measured on the reference surface 11b, measurement points B5 and B6 have been measured on the reference surface 11c, and measurement points B7 and B8 have been measured on the reference surface 11d.

Similarly, measurement points D1 and D2 have been measured on the reference surface 12a, measurement points D3 and D4 have been measured on the reference surface 12b, and measurement points D5 and D6 have been measured on the reference surface 12c. Moreover, measurement points F1 and F2 have been measured on the reference surface 13a, measurement points F3 and F4 have been measured on the reference surface 13b, and measurement points F5 and F6 have been measured on the reference surface 13c. Further, measurement points H1 and H2 have been measured on the reference surface 14a, measurement points H3 and H4 have been measured on the reference surface 14b, and measurement points H5 and H6 have been measured on the reference surface 14c. Furthermore, measurement points K1 and K2 have been measured on the reference surface 15a, measurement points K3 and K4 have been measured on the reference surface 15b, and measurement points K5 and K6 have been measured on the reference surface 15c.

The measurement points B1 to B8, D1 to D6, F1 to F6, H1 to H6, and K1 to K6 may be measured at one point for each measurement point. Nevertheless, herein, multiple points are measured in the vicinity of the measurement point, and average values of these are determined as measured values at the measurement point. In the case of performing the measurement at multiple points, for example, as represented by the measurement point K2 in Part (b) of FIG. 3 to be described later, multiple points on a straight line passing through the measurement point K2 may be measured; alternatively, as represented by a measurement point J1 in Part (c) of FIG. 3 to be described later, multiple points on a circle having the center located at the measurement point J1 may be measured together with the measurement point J1.

As described above, the processing inspection workpiece 10 has such a configuration that the processing surfaces 11 to 15 respectively have the multiple reference surfaces 11a to 11d, 12a to 12c, 13a to 13c, 14a to 14c, and 15a to 15c as the measurement references. Nevertheless, the processing inspection workpiece 10 should have at least such a configuration that one reference surface has one processing surface. However, in order to enhance the measurement accuracy, the configuration is desirably such that one processing surface has multiple reference surfaces. For example, although the processing surfaces 12 to 15 respectively have the three reference surfaces 12a to 12c, 13a to 13c, 14a to 14c, and 15a to 15c, the processing inspection workpiece 10 may also have such a configuration that each of the processing surfaces 12 to 15 is provided with a reference surface thereunder to have four reference surfaces like the processing surface 11.

Additionally, the processing inspection workpiece 10 has such a configuration that the hexahedral shape thereof is cut and processed to provide the reference surfaces 11a to 11d, 12a to 12c, 13a to 13c, 14a to 14c, and 15a to 15c. Alternatively, the hexahedral shape may be cut and processed into another shape such as rectangular hexahedron (cuboid) or regular hexahedron (cube).

An example of the on-machine measurement method using the processing inspection workpiece 10 having such configurations will be described with reference to FIGS. 2 and 3.

Before a measurement, the processing inspection workpiece 10 described above is installed to a machine tool, and the processing surfaces 11 to 15 are milled using a face milling cutter, for example. In the case where five surfaces are processed, a double-column, 5-face milling machine having a vertical spindle head and a right angle head may be used to process the processing surface 11 at the top surface with the vertical spindle head, and process the processing surfaces 12 to 15 at the side surfaces with the right angle head.

After the processing inspection workpiece 10 is processed, an attachment is replaced with a measurement sensor, for example, a touch sensor. After the processing, on-machine measurement is performed on the processing inspection workpiece 10 using the touch sensor according to a procedure described below. In the case of using a double-column, 5-face milling machine having a vertical spindle head and a right angle head, the on-machine measurement may be performed on the processing surface 11 at the top surface with the vertical spindle head, and on the processing surfaces 12 to 15 at the side surfaces with the right angle head. Incidentally, herein, the description will be given mainly of the measurement on the processing surface 15 as the surface at a 270-degree position.

(1)

Measured are coordinates of the measurement point K2 on the reference surface 15a of the processing inspection workpiece 10 set on the machine tool. As the coordinates of the measurement point K2, machine coordinates of the machine tool at the time when the touch sensor detects the contact are recorded.

Figure 3A:
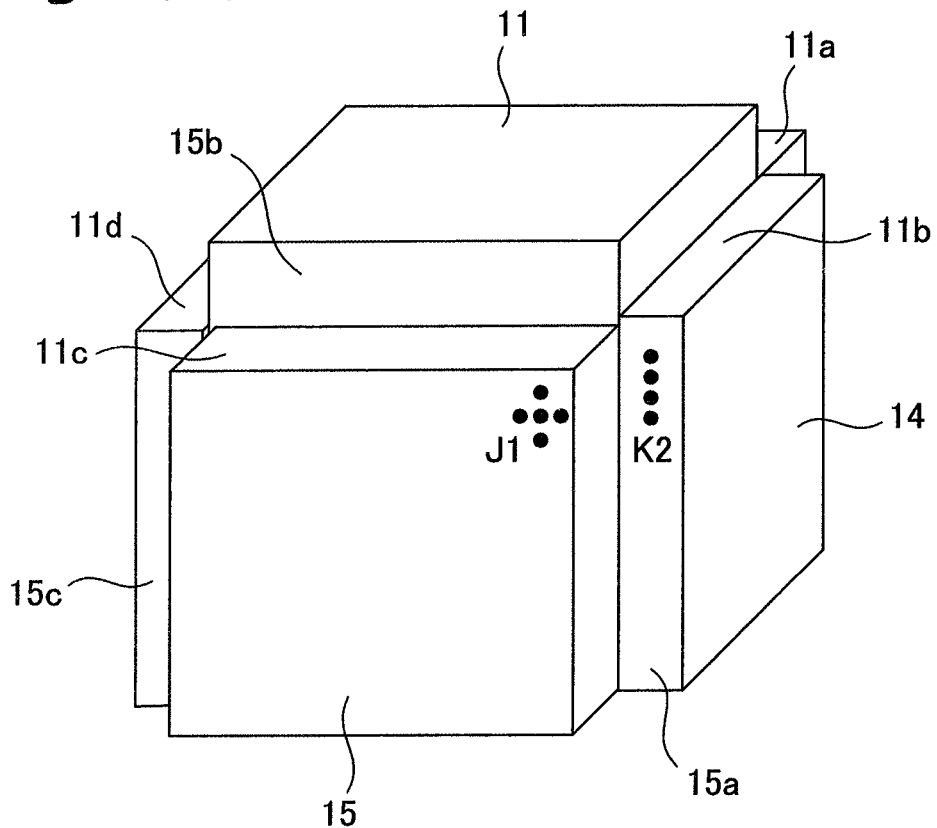
FIG. 3 shows views for more specifically explaining the example of the embodiment of the on-machine measurement method using the processing inspection workpiece for a machine tool according to the present invention, Part (a) thereof is a perspective view of the processing inspection workpiece, Part (b) thereof is an enlarged view of measurement points on a reference surface, and Part (c) thereof is an enlarged view of measurement points on a processing surface.
Figure 3B:
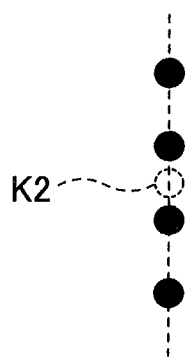
Figure 3C:
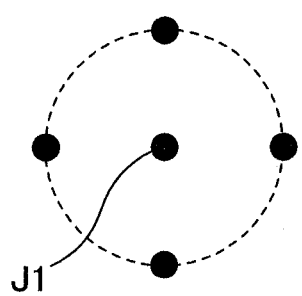

In this measurement, as shown in Part (b) of FIG. 3, four points (which may include the measurement point K2 itself) on a straight line passing through the measurement point K2 are measured, and average values thereof are determined as measured values of the measurement point K2. Herein, the interval of multiple points to be measured is set to be equal, for example, 1 mm pitch.

(2)

Measured are coordinates of the measurement point J1, which is a measurement point near the measurement point K2, on the processing surface 15 associated with the reference surface 15a. As the coordinates of the measurement point J1 also, machine coordinates of the machine tool at the time when the touch sensor detects the contact are recorded. Measuring such nearby measurement points shortens the movement distance of the touch sensor, and thus can reduce or eliminate a movement error in the movement.

In this measurement, three or more positions on the circle having a predetermined radius and the center located at the position of the measurement point J1 are measured together with the position of the measurement point J1. Herein, as shown in Part (c) of FIG. 3, positions of four points on the circle which are equally divided into four are measured, and the radius of the circle is set to, for example; 1 mm.

Moreover, in this coordinate measurement, the measured data are statistically processed. For example, average values of all the data, average values of data from which maximum and minimum values (measured abnormal values) are excluded, or the like are obtained as the coordinates. Utilizing such average values can reduce or eliminate the influence of measurement error due to the state and surface roughness of the processing surface, a foreign substance, or the like.

(3)

Coordinates of the measurement point K1 on the reference surface 15a of the processing inspection workpiece 10 are measured in the same manner as in (1) above.

(4)

Coordinates of a measurement point J2, which is a measurement point near the measurement point K1, on the processing surface 15 associated with the reference surface 15a are measured in the same manner as in (2) above.

(5)

From the known reference coordinates of the measurement points K1 and K2 having been measured in advance with the coordinate measuring machine, and the measured coordinates of the measurement points K1 and K2 thus measured by the on-machine measurement in (1) and (3) above, errors of the measurement points K1 and K2 in the measured coordinates are determined with respect to the known reference coordinates. Thereby, a line K1-K2 constituting the reference surface 15a is determined.

(6)

From the measured coordinates of the measurement points J1 and J2 thus measured by the on-machine measurement in (2) and (4) above, a line J1-J2 constituting the processing surface 15 is determined, and an inclination relative to the line K1-K2 serving as the reference is determined.

(7)

The procedures (1) and (2) are carried out on all the measurement points on the reference surfaces and all the measurement points on the processing surfaces in such a manner that the measurement points of the reference surface and the nearby processing surface are paired with each other.

For example, when measured coordinates of the measurement points J1 to J4 are determined together with the measured coordinates of the measurement points K1 to K6, an inclination of a plane J1-J4 constituting the processing surface 15 is determined relative to a plane K1-K6 serving as the reference. When such procedures are carried out on all of the processing surfaces, the parallelisms of the five surfaces are also determined.

Moreover, for example, when measured coordinates of measurement points A1 and A4 are determined, a line A1-A4 constituting the processing surface 11 at the top surface is determined from the measured coordinates of the measurement points A1 and A4, and the perpendicularity relative to the line J1-J2 constituting the processing surface 15 and the line K1-K2 serving as the reference is determined. When such procedures are carried out on all of the processing surfaces, the perpendicularity among the five surfaces is determined.

Further, when the measurements are performed at many points on each processing surface to determine measured coordinates at the many measurement points, the flatness and the step of each processing surface are determined.

Note that when boring is performed on the processing surface to form one or multiple holes, the eccentricity, the circularity, and the cylindricity of the bored holes, as well as distances between centers of the holes can also be determined with reference to the reference surface.

As described above, the use of the processing inspection workpiece 10 having the known reference surfaces to measure and compare the reference surfaces having known accuracies (known measured coordinate values) and a processing surface of an inspection target with each other enables not only on-machine measurement of a machine tool but also accurate on-machine measurement. As a result, an inspection of a working accuracy of the machine tool is possible without a coordinate measuring machine. Further, based on the working accuracy inspection, the measurement result may be feedbacked to the machine tool to correct the processing position of the machine tool or adjust the accuracy.

Furthermore, measuring a measurement point at multiple points on a circle having the center located at the measurement point makes it possible to eliminate error data during the on-machine measurement, and enhance the reliability of measured data.

INDUSTRIAL APPLICABILITY

The present invention is suitable for on-machine measurement of a processing accuracy of a machine tool.

REFERENCE SIGNS LIST 10 processing inspection workpiece.
11 processing surface
11a to 11d reference surface
12 processing surface
12a to 12c reference surface
13 processing surface
13a to 13c reference surface
14 processing surface
14a to 14c reference surface
15 processing surface
15a to 15c reference surface

The invention claimed is:

1. An on-machine measurement method using a processing inspection workpiece for a machine tool, the method comprising:
   Using the processing inspection workpiece which has at least one processing surface, and at least one reference surface facing in a direction in which the processing surface faces, and having a plurality of in-plane measurement points whose coordinates are known;
   replacing an attachment of the machine tool with a measurement sensor configured to detect a contact position with the processing inspection workpiece, after the machine tool processes the processing inspection workpiece;
   performing a first measurement to measure the measurement points on the reference surface by using the measurement sensor;
   performing, after the first measurement, a second measurement to measure a measurement point on the processing surface near the measurement points on the reference surface by using the measurement sensor; and
   detecting coordinates of all the measurement points by alternately performing the first measurement and the second measurement on all of the reference surface and the processing surface.

2. The on-machine measurement method using the processing inspection workpiece for a machine tool according to claim 1, wherein
   the processing inspection workpiece has a shape of a hexahedron,
   each of five surfaces of the hexahedron excluding a bottom surface thereof is the processing surface, and
   each of the processing surfaces is provided with a plurality of the reference surfaces.

3. The on-machine measurement method using the processing inspection workpiece for a machine tool according to claim 2, wherein coordinates of at least the measurement point on the processing surface among the measurement points on the reference surface and the processing surface are determined from average values of coordinates obtained by measuring a position of the measurement point on the processing surface and three or more positions on a circle having a predetermined radius and a center located at the position of the measurement point.

4. The on-machine measurement method using the processing inspection workpiece for a machine tool according to claim 1, wherein coordinates of at least the measurement point on the processing surface among the measurement points on the reference surface and the processing surface are determined from average values of coordinates obtained by measuring a position of the measurement point on the processing surface and three or more positions on a circle having a predetermined radius and a center located at the position of the measurement point.

* * * * *